(12) United States Patent
Bar Oz et al.

(10) Patent No.: US 10,999,152 B1
(45) Date of Patent: May 4, 2021

(54) DISCOVERY PATTERN VISUALIZER

(71) Applicant: ServiceNow, Inc., Santa Clara, CA (US)

(72) Inventors: Tom Bar Oz, Herzliya (IL); Shay Herzog, Raanana (IL); Asaf Garty, Sdei Hemed (IL); Bary Solomon, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/852,851

(22) Filed: Apr. 20, 2020

(51) Int. Cl.
  *H04L 12/24* (2006.01)
  *H04L 29/08* (2006.01)
  *H04L 12/26* (2006.01)

(52) U.S. Cl.
  CPC .............. *H04L 41/12* (2013.01); *H04L 41/22* (2013.01); *H04L 67/36* (2013.01); *H04L 41/0853* (2013.01); *H04L 43/0817* (2013.01); *H04L 67/16* (2013.01)

(58) Field of Classification Search
  CPC ......... H04L 41/08; H04L 41/085–0859; H04L 41/12; H04L 41/22; H04L 41/5041–5058; H04L 67/10; H04L 67/16; H04L 67/34
  See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

"Orlando IT Operations Management," servicenow, Apr. 16, 2020.
"Orland IT Operations Management—Patterns and horizontal discover," Apr. 16, 2020.

*Primary Examiner* — Brendan Y Higa
(74) *Attorney, Agent, or Firm* — McDonnell Boehnen Hulbert & Berghoff LLP

(57) ABSTRACT

A system may include persistent storage containing discovery patterns configured to identify computing resources and relationships therebetween, and an application configured to perform operations, including selecting a discovery pattern from the discovery patterns and obtaining, from the persistent storage, source code representing the discovery pattern. The operations may also include parsing the source code to determine therein (i) a plurality of configuration items (CIs) representing the computing resources that the discovery pattern is configured to discover when executed, and (ii) relationships between respective CIs of the plurality of CIs. The operations may additionally include generating a representation of the discovery pattern based on the plurality of CIs and the relationships. The representation may include the plurality of CIs represented by a plurality of nodes and the relationships represented by edges between respective nodes. The representation may be stored in the persistent storage in association with the discovery pattern.

20 Claims, 12 Drawing Sheets

(56) References Cited

U.S. PATENT DOCUMENTS

| | | |
|---|---|---|
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsharn et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weldl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2015/0242204 A1* | 8/2015 | Hassine .............. H04L 41/0853 717/121 |
| 2018/0324054 A1* | 11/2018 | Biran ....................... H04L 41/22 |
| 2019/0028369 A1* | 1/2019 | Wiener ............... H04L 41/0853 |
| 2020/0201887 A1* | 6/2020 | Bar Oz ............... H04L 41/0853 |
| 2020/0204443 A1* | 6/2020 | Bar Oz ............... H04L 67/2842 |
| 2020/0204449 A1* | 6/2020 | Bitterfeld ............... H04L 41/12 |
| 2020/0403862 A1* | 12/2020 | Erblat ................. H04L 41/0813 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

```
700 → PATTERN {
701 →     METADATA {
702 →         ID = "7C3386A20FF29200A52AFA6CE1050EA8"
703 →         NAME = "F5 LOAD BALANCER"
704 →         DESCRIPTION = "DISCOVERY PATTERN FOR F5 LOAD BALANCER"
705 →         CITYPE = "CMDB_CI_LB_BIGIP"
706 →     }
707 →                         ...
708 →     STEP {
709 →         NAME = "REF BETWEEN SERIAL TO LB"
710 →         RELATION_REFERENCE {
711 →             TABLE1_NAME = "CMDB_SERIAL_NUMBER"
712 →             TABLE2_NAME = "CMDB_CI_LB_BIGIP"
713 →             RESULT_TABLE_NAME = "SER_TO_LB"
714 →                         ...
715 →             REF_DIRECTION = PARENTTOCHILD
716 →             RELATION_TYPE = "REFERENCE"
717 →         }
718 →     }
719 →                         ...
```

FIG. 7A

```
STEP {
    NAME = "REF/REL BETWEEN POOL AND PMEMBER"
    RELATION_REFERENCE {
        TABLE1_NAME = "CMDB_CI_LB_POOL"
        KEY1_NAME = "NAME"
        TABLE2_NAME = "CMDB_CI_LB_POOL_MEMBER"
        KEY2_NAME = "POOLNAME"
        RESULT_TABLE_NAME = "P_MEMBER_TO_POOL"
            ...
        REF_DIRECTION = CHILDTOPARENT
        RELATION_TYPE = "OWNS::OWNED BY"
            ...
    }
}
```

DISCOVERY PATTERN VISUALIZER

BACKGROUND

Computing devices, software applications, storage structures, and other computing resources that make up a computer network may be discovered and the relationships therebetween may be mapped. Representations of these elements of the computer network, as well as the relationships, may be stored as configuration items in a database. The stored configuration items may later be retrieved and used to generate a visualization of a state or arrangement of these elements within the computer network, or used for other purposes. Discovering computing resources involves developing software processes that are capable of gathering the information needed for detection, classification, and/or identification of these computing resources.

SUMMARY

Managed networks may include therein pluralities of different computing devices, operating systems, software applications, and other computing resources. Additionally, the managed networks may utilize third-party computing systems, each of which may also contain a particular arrangement of computing resources. The specific set of computing resources utilized by a managed network may vary from network to network to accommodate the preferences, needs, operations, and/or other attributes of a given managed network.

With the aid of one or more discovery patterns, the specific set of computing resources utilized by a managed network may be discovered and mapped to generate a comprehensive and accurate representation thereof (e.g., a map). Specifically, a discovery pattern may be a group of functions and/or operations configured to identify and gather information about a particular computing resource or group thereof. The gathered information may be stored in a database as one or more configuration items (CIs). Each discovery pattern may be different, and the functions and operations thereof may depend on how information about the corresponding computing resource(s) is stored. For example, some discovery patterns may obtain information about the corresponding computing resource by way of an operating system shell, while others may utilize an application programming interface (API) by way of which the information is exposed.

Discovery patterns may be defined by writing source code using, for example, a discovery application (e.g., an integrated development environment tailored to developing and/or executing discovery patterns). It may, however, be difficult to understand the arrangement of CIs generated by a particular discovery pattern by looking at source code alone, even when the source code is well commented, annotated, styled, and/or formatted. For example, it may be time-consuming to manually review the source code of a discovery pattern to determine the CIs and the relationships thereamong that the discovery pattern is configured to generate. Thus, such a manual approach may make it difficult to, for example, quickly evaluate whether a particular discovery pattern is configured to discover a given set of computing resources utilized by a managed network.

Accordingly, provided herein is a software application configured to generate, based on the source code of a particular discovery pattern, a representation of the CIs and the relationships thereamong that the particular discovery pattern is configured to generate. The representation, which may be graphically displayed, may include a plurality of nodes interconnected by edges. Each node may represent a respective CI, while each edge may represent a respective relationship between two or more CIs. The software application may be integrated with the discovery application, or may be provided as a stand-alone application that cooperates with the discovery application.

The software application may be configured to generate the representation on the basis of the source code that defines the discovery pattern. Specifically, the application may be configured to select a discovery pattern to be analyzed (e.g., based on user input), and obtain the source code of the discovery pattern. The application may parse the source code to determine therein a plurality of CIs representing the computing resources that the discovery application is configured to discover and relationships among these CIs. Specifically, the application may search the source code for textual patterns of alphanumeric keywords that define the CIs and the relationships thereamong. The application may define the nodes and edges that represent the CIs and the relationships, respectively, of the discovery pattern on the basis of the information extracted by parsing of the source code. The representation of the discovery pattern may be stored for later retrieval.

The representation may be visually rendered to illustrate the structure of computing resources and attributes thereof that the discovery pattern is configured to discover. For example, a user or programmer unfamiliar with the discovery pattern may use the application to generate a visual rendering of the CIs and relationships thereamong associated with a particular discovery pattern to thereby more quickly understand the function, purpose, or role of the discovery pattern. Similarly, a programmer of the discovery pattern may use the application to periodically visualize the structure of the discovery pattern during the course of development of the discovery pattern. Thus, the programmer may rapidly determine whether the CI structure defined by the discovery pattern matches what the programmer expected (e.g., the structure of the computing resources that the discovery pattern is intended to discover).

In some implementations, the software application may also be configured to determine additional properties of the CIs and the relationships. For example, the application may, for a pair of related CIs, determine a parent CI and a child CI in the pair, thereby determining the direction of the relationship. Additionally or alternatively, the application may determine a type of the relationship, which may indicate that a first CI runs on, references, uses, owns, manages, or consumes the second CI, among other possible types of relationships.

In some implementations, as the discovery pattern changes over time, the application may re-parse the updated source code to generate an updated representation of the discovery pattern. In some cases, the representation may be stored in association with documentation of the discovery pattern. Thus, as the discovery pattern changes over time, at least part of the documentation may be automatically updated to reflect the changes.

Further, in some implementations, the software application may also be configured to generate a second representation of the discovery pattern that indicates, for each respective CI of the CIs configured to be generated by the discovery pattern, the order in which functions of the discovery pattern are executed to generate the respective CI. That is, the second representation may identify the discovery pattern functions that contribute to generating the respective CI, as well as the order in which these functions modify the respective CI.

Notably, the representation of a given discovery pattern may be different from the map that is generated when the discovery pattern is executed against a managed network. Specifically, execution of the discovery pattern may, for each CI within the representation, generate multiple instantiations of that CI to represent multiple occurrences of the corresponding computing resource within the managed network. Thus, the representation of the discovery pattern generated by the application indicates the structure according to which computing resources associated with the managed network are expected to be arranged, whereas the map generated by executing the discovery pattern indicates the actual arrangement of these computing resources.

Accordingly, a first example embodiment may involve selecting, by an application, a discovery pattern from one or more discovery patterns contained in persistent storage. The one or more discovery patterns may be configured to identify computing resources associated with a managed network and relationships between the computing resources. The first example embodiment may also involve obtaining, by the application and from the persistent storage, source code representing the discovery pattern. The first example embodiment may additionally involve parsing, by the application, the source code to determine therein (i) a plurality of CIs representing the computing resources that the discovery pattern is configured to discover when executed, and (ii) one or more relationships between respective CIs of the plurality of CIs. The first example embodiment may further involve generating, by the application, a representation of the discovery pattern based on the plurality of CIs and the one or more relationships. The representation may include the plurality of CIs represented by a plurality of nodes and the one or more relationships represented by one or more edges between respective nodes of the plurality of nodes. The first example embodiment may yet further involve storing, by the application, the representation in the persistent storage in association with the discovery pattern.

In a second example embodiment, a computing system may include persistent storage containing one or more discovery patterns configured to identify computing resources associated with a managed network and relationships between the computing resources. The computing system may also include an application configured to perform operations including selecting a discovery pattern from the one or more discovery patterns. The operations may also include obtaining, from the persistent storage, source code representing the discovery pattern. The operations may additionally include parsing the source code to determine therein (i) a plurality of CIs representing the computing resources that the discovery pattern is configured to discover when executed, and (ii) one or more relationships between respective CIs of the plurality of CIs. The operations may further include generating a representation of the discovery pattern based on the plurality of CIs and the one or more relationships. The representation may include the plurality of CIs represented by a plurality of nodes and the one or more relationships represented by one or more edges between respective nodes of the plurality of nodes. The operations may yet further include storing the representation in the persistent storage in association with the discovery pattern.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

In a sixth example embodiment, a system may include means for selecting a discovery pattern from one or more discovery patterns contained in persistent storage. The one or more discovery patterns are configured to identify computing resources associated with a managed network and relationships between the computing resources. The sixth example embodiment may also include means for obtaining, from the persistent storage, source code representing the discovery pattern. The sixth example embodiment may additionally include means for parsing the source code to determine therein (i) a plurality of CIs representing the computing resources that the discovery pattern is configured to discover when executed, and (ii) one or more relationships between respective CIs of the plurality of CIs. The sixth example embodiment may further involve means for generating a representation of the discovery pattern based on the plurality of CIs and the one or more relationships. The representation may include the plurality of CIs represented by a plurality of nodes and the one or more relationships represented by one or more edges between respective nodes of the plurality of nodes. The sixth example embodiment may yet further involve means for storing the representation in the persistent storage in association with the discovery pattern.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A and 7B illustrate discovery pattern source code, in accordance with example embodiments.

DETAILED DESCRIPTION

Figure 1:
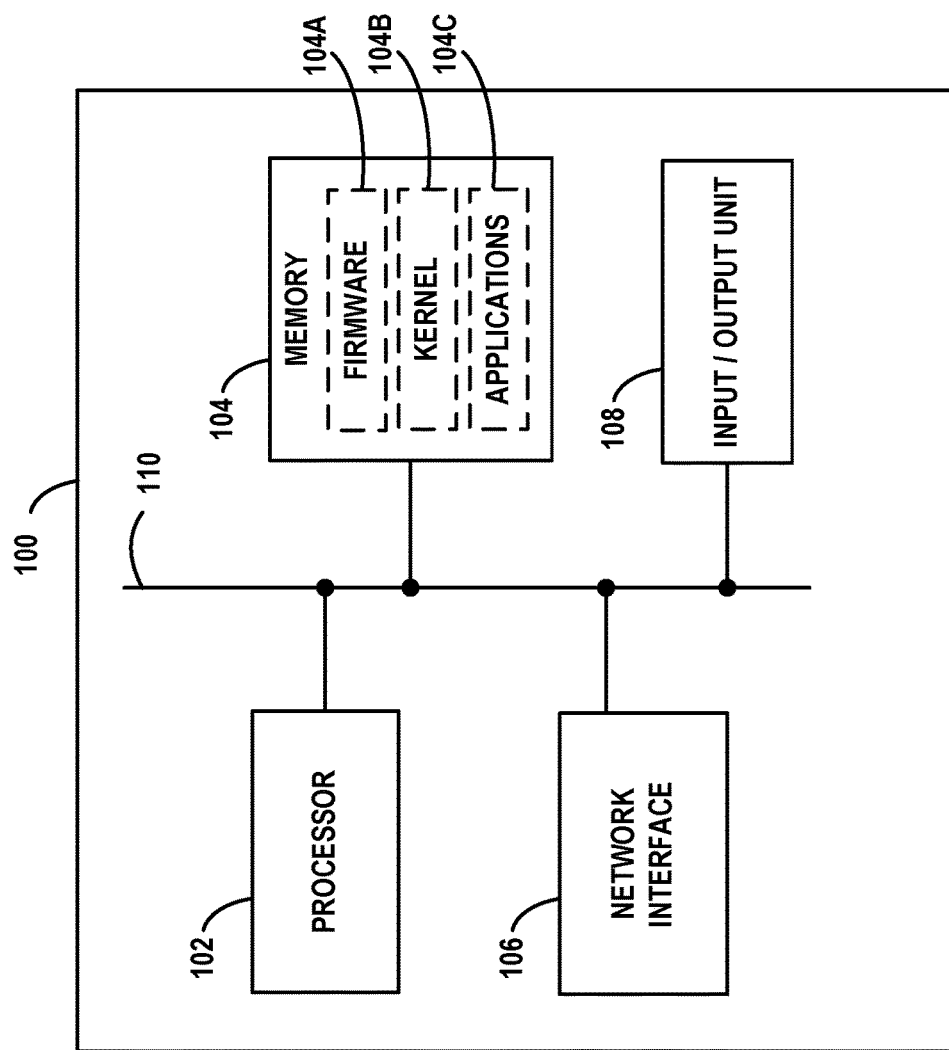
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
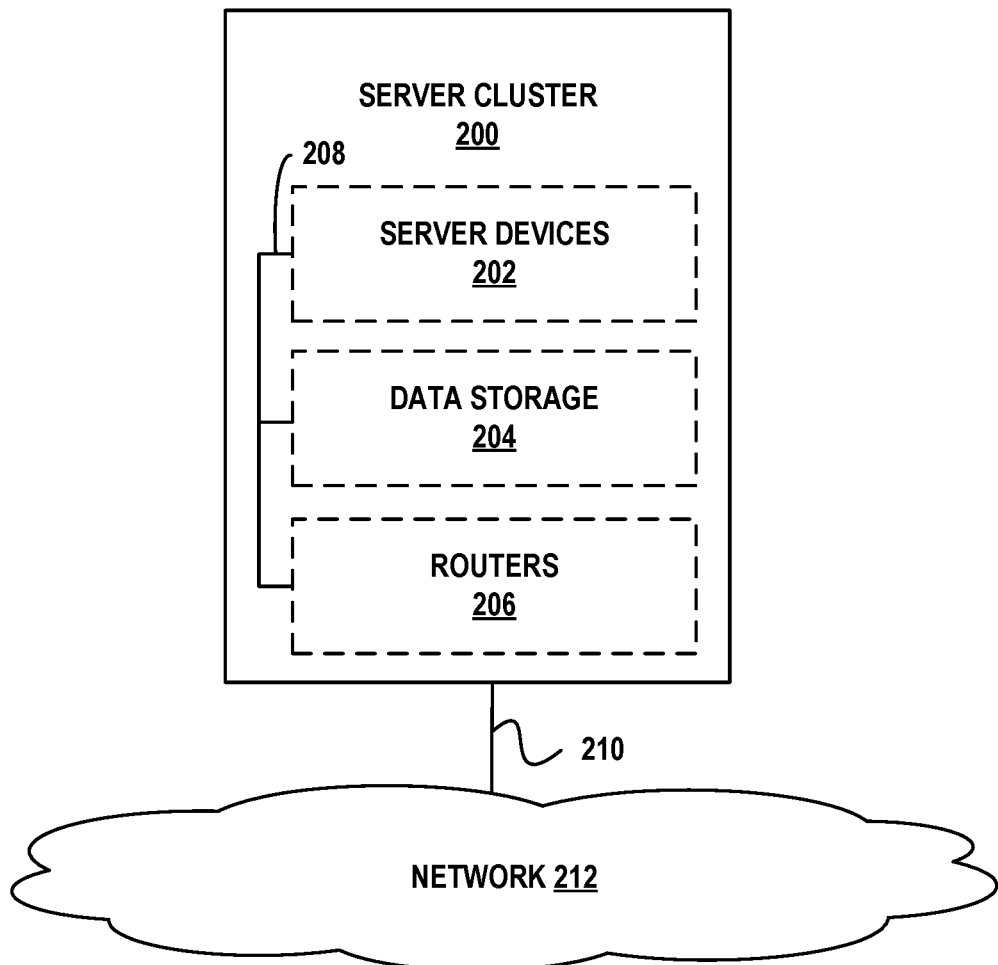
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
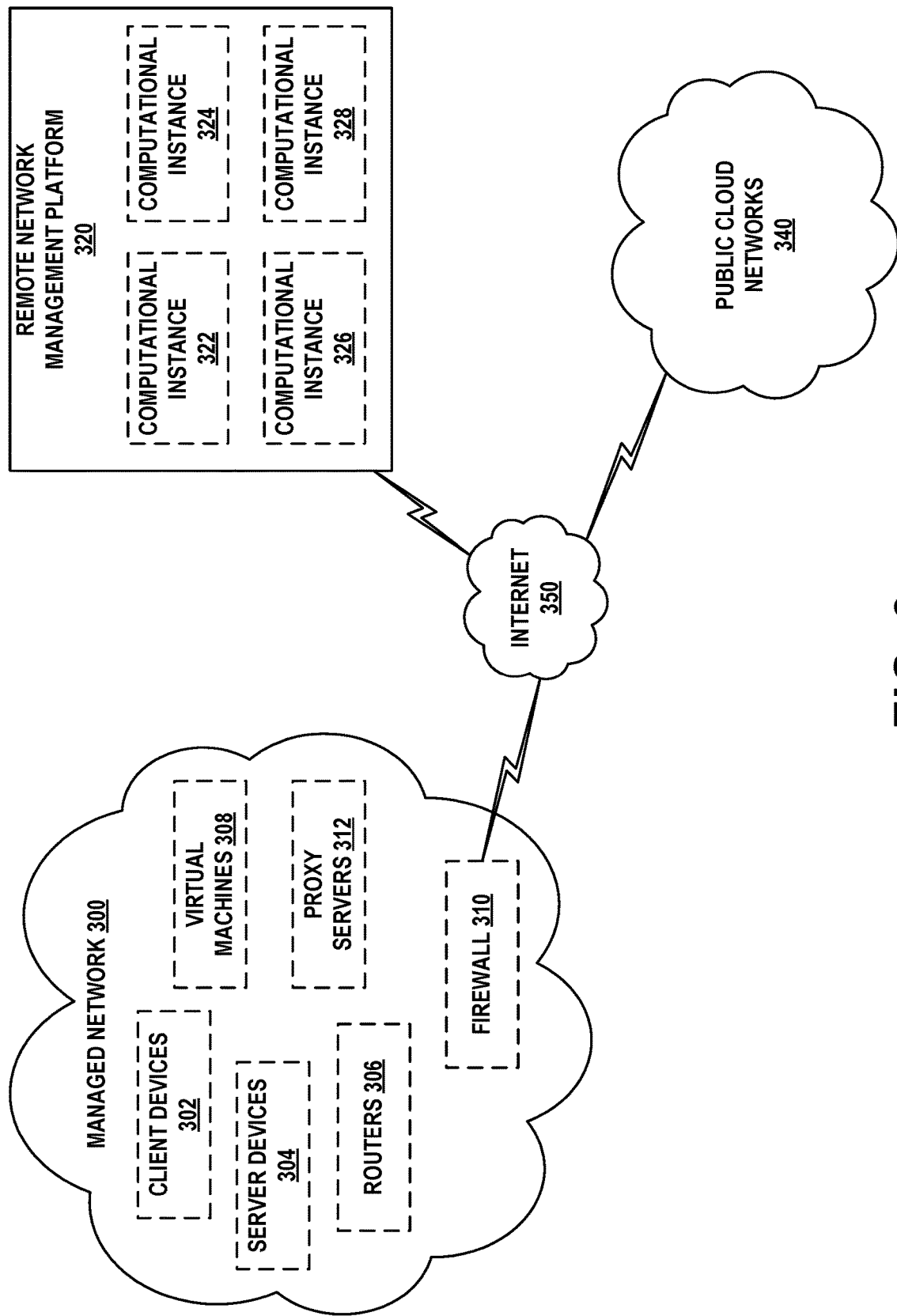
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
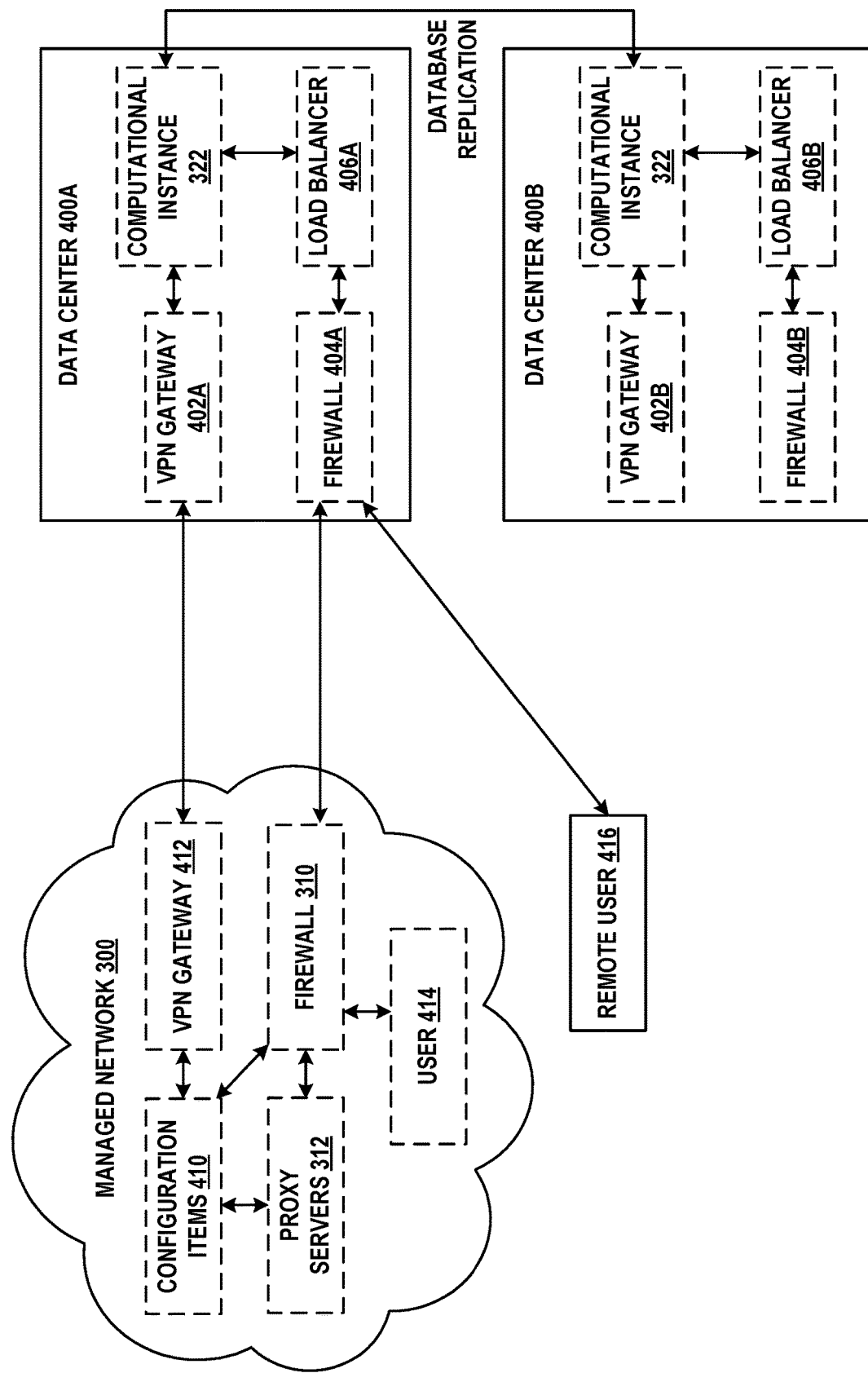
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP)

addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
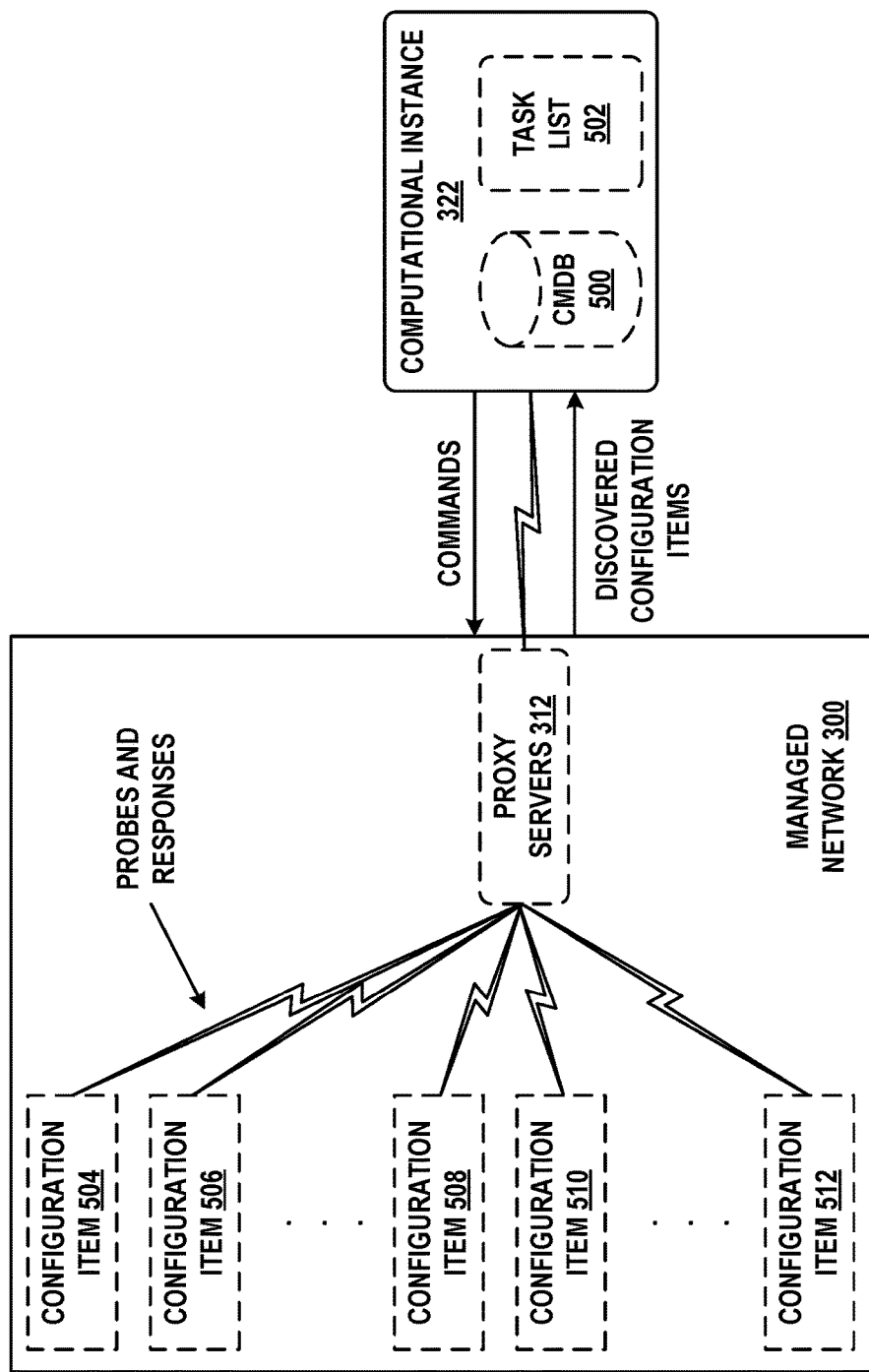
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
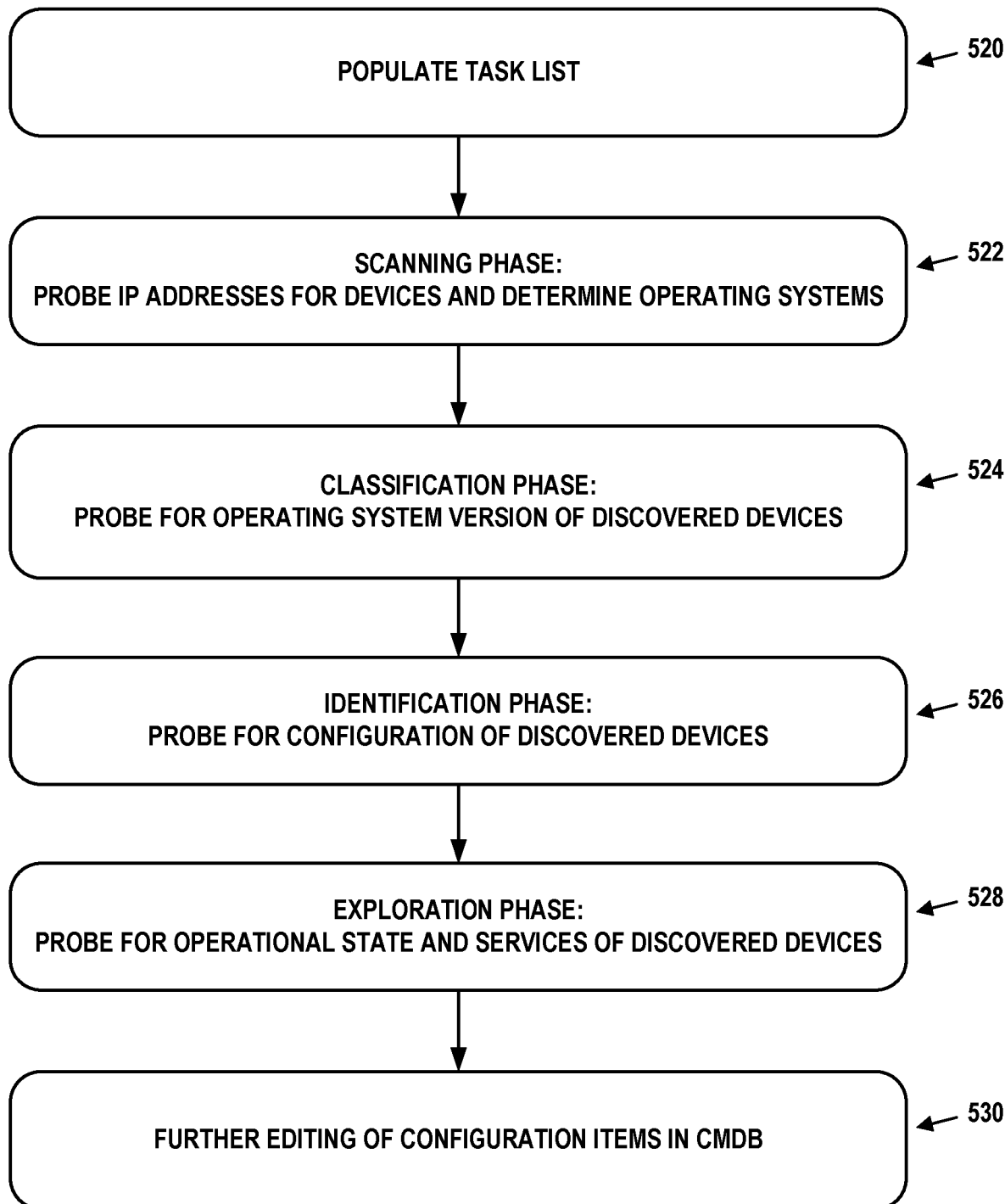
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Discovery Pattern Analysis

A discovery application may be configured to allow for development and/or execution of discovery patterns configured to discover and map computing resources associated with a managed network. The discovered computing resources and attributes thereof may be represented by and stored as one or more CIs associated with the managed network. The discovery patterns may be defined by source code. The statements, functions, operations, and/or expected outputs of the source code may be difficult to understand and/or visualize without time-consuming manual analysis thereof. Thus, it may be difficult to understand what CIs and relationships therebetween a particular discovery pattern is configured to generate, as well as what functions of the discovery pattern are involved in generating a particular CI. Accordingly, provided herein is a software application configured to facilitate the analysis and visualization of discovery patterns.

Figure 6:
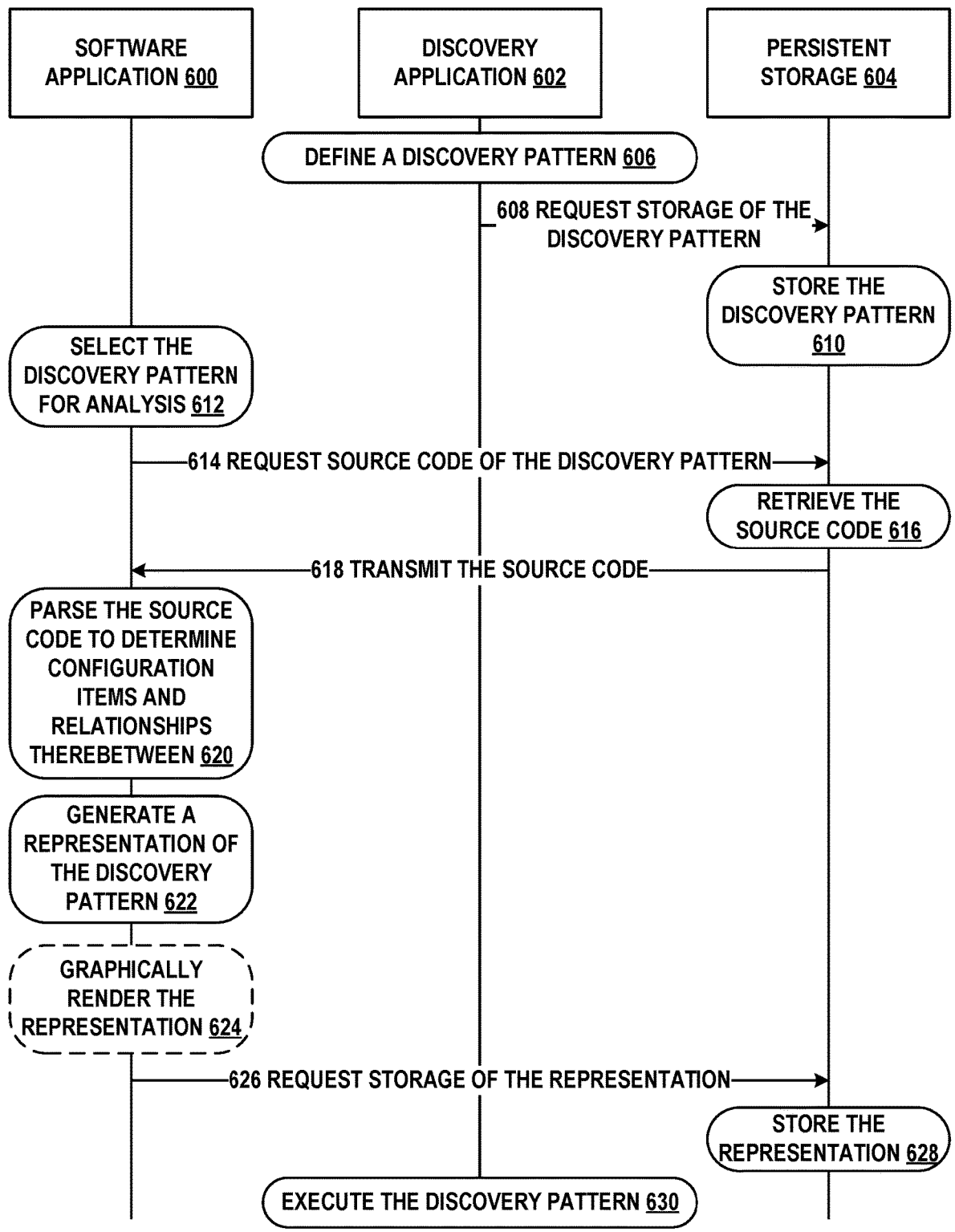
FIG. 6 is a message flow diagram, in accordance with example embodiments.

FIG. 6 illustrates a message flow diagram of operations involved in generating a representation of a discovery pattern. Specifically, FIG. 6 illustrates software application 600, discovery application 602, and persistent storage 604. Discovery application 602 may be configured to develop and/or execute one or more discovery patterns, each of which may include one or more functions or operations configured to discover, map, and/or adjust aspects of a corresponding computing resource. Software application 600 may be configured to analyze the one or more discovery patterns and generate a representation thereof. In some implementations, software application 600 may be a stand-alone application. Alternatively, software application 600 may be integrated with discovery application 602.

In one implementation, software application 600, discovery application 602, and/or persistent storage 604 may be disposed in or form part of a computational instance (e.g., computational instance 322) of remote network management platform 320. This computational instance may be assigned to managed network 300. Thus, discovery application 602 may discover, map, and/or adjust various computing resources associated with manage network 300 using the one or more discovery patterns. In other implementations, portions of software application 600, discovery application 602, and/or persistent storage 604 may be disposed in, form part of, or be executed with the assistance of proxy servers 312. For example, some or all portions of the one or more discovery patterns deployed by discovery application 602 may be executed by proxy servers 312.

Persistent storage 604 may be configured to store therein the one or more discovery patterns, representations of the one or more discovery patterns generated by software application 600, and/or one or more maps of computing resources discovered as a result of executing the one or more discovery patterns by discovery application 602. Persistent storage 604 may, in some implementations, include and/or take the form of a database. An example map generated by discovery application 602 may include a plurality of computing devices associated with managed network 300, a plurality of software applications executable on one or more of these computing devices, and interconnections between these computing devices and software applications, among other information. The map may be stored in persistent storage 604 as CIs, which may be retrieved from persistent storage 604 by various computing devices and used to generate a visualization of the map. Discovery application 602 may be configured to modify the map over time as the state of managed network 300 changes. Other uses of configuration items beyond that of visualization have been described above.

Discovery application 602 may be used to define a discovery pattern, as indicated by block 606. The discovery pattern may be defined by writing source code that contains programmatic statements, functions, and/or operations configured to identify a computing resource, gather information regarding the computing resource, and/or relate the computing resource to other computing resources. To that end, discovery application 602 may provide a user interface by way of which the source can be written and/or modified, and may be configured to format and/or organize the source code in a way that makes it relatively easy for a programmer to read.

Based on or in response to definition of the discovery pattern at block 606, discovery application 602 may be configured to request storage of the discovery pattern, as indicated by arrow 608. Based on or in response to reception of the request at arrow 608, persistent storage 604 may be configured to store the discovery pattern, as indicated by block 610. The operations of blocks 606 and 610 and arrow 608 may be repeated to define new discovery patterns and/or to modify existing discovery patterns.

Discovery application 602 may be used to execute the discovery pattern once it has been defined. For example, the discovery pattern may be executed shortly after being defined. In another example, as indicated by block 630, the discovery pattern may be executed after software application 600 generates the representation of the discovery pattern.

Specifically, it may be beneficial to analyze the discovery pattern by way of software application 600 prior to execution of the discovery pattern to determine whether it is configured as expected, or to better understand the discovery pattern's functions, operations, and outputs. The representation of the discovery pattern may be compared to an expected structure of the computing resources or computing system for which the discovery pattern is targeted, and/or a behavior and/or output desired by the programmer. For example, the programmer may view the representation to determine that it matches the programmer's expectations of the discovery pattern, and the discovery pattern is thus fit for execution, or that the discovery pattern likely contains errors that are to be corrected prior to execution.

Accordingly, software application 600 may be configured to select, from the one or more discovery patterns stored in persistent storage 604, a discovery pattern for analysis, as indicated by block 612. In one example, software application 600 may be configured to provide a user interface by way of which a user may select the discovery pattern for analysis. In another example, software application 600 may be configured to perform the selection without user input by selecting a discovery pattern that has not been analyzed by software application 600 since being defined or updated.

Based on or in response to selection of the discovery pattern at block 612, software application 600 may be configured to transmit, to persistent storage 604, a request for source code of the selected discovery pattern, as indicated by arrow 614. Based on or in response to reception of the request at arrow 614, persistent storage 604 may be configured to retrieve the source code, as indicated by block 616. Based on or in response to retrieval of the source code at block 616, persistent storage 604 may be configured to transmit the source code to software application 600, as indicated by arrow 618. The source code may include first source code that implements the discovery pattern and second source code of one or more software libraries invoked by the first source code. Thus, software application 600 may be provided with a complete definition of the discovery pattern that may involve source code that is not explicitly included in a file that stores the discovery pattern, but which might instead be indirectly linked to this file.

Based on or in response to reception of the source code at arrow 618, software application 600 may be configured to parse the source code to determine therein a plurality of CIs and relationships between the CIs, as indicated by block 620. The CIs may represent the computing resources that the discovery pattern is configured to discover when executed, while the relationships may be relationships that the discovery pattern is configured to generate between the CIs when executed. The parsing of the source code may involve searching the source code for textual patterns of one or more alphanumeric keywords that identify the CIs and/or the one or more relationships. Such textual patterns may identify sections of the source code in which the CIs and the relationships are defined. Examples of such textual patterns are illustrated in and discussed with respect to FIGS. 7A and 7B.

Figure 8:
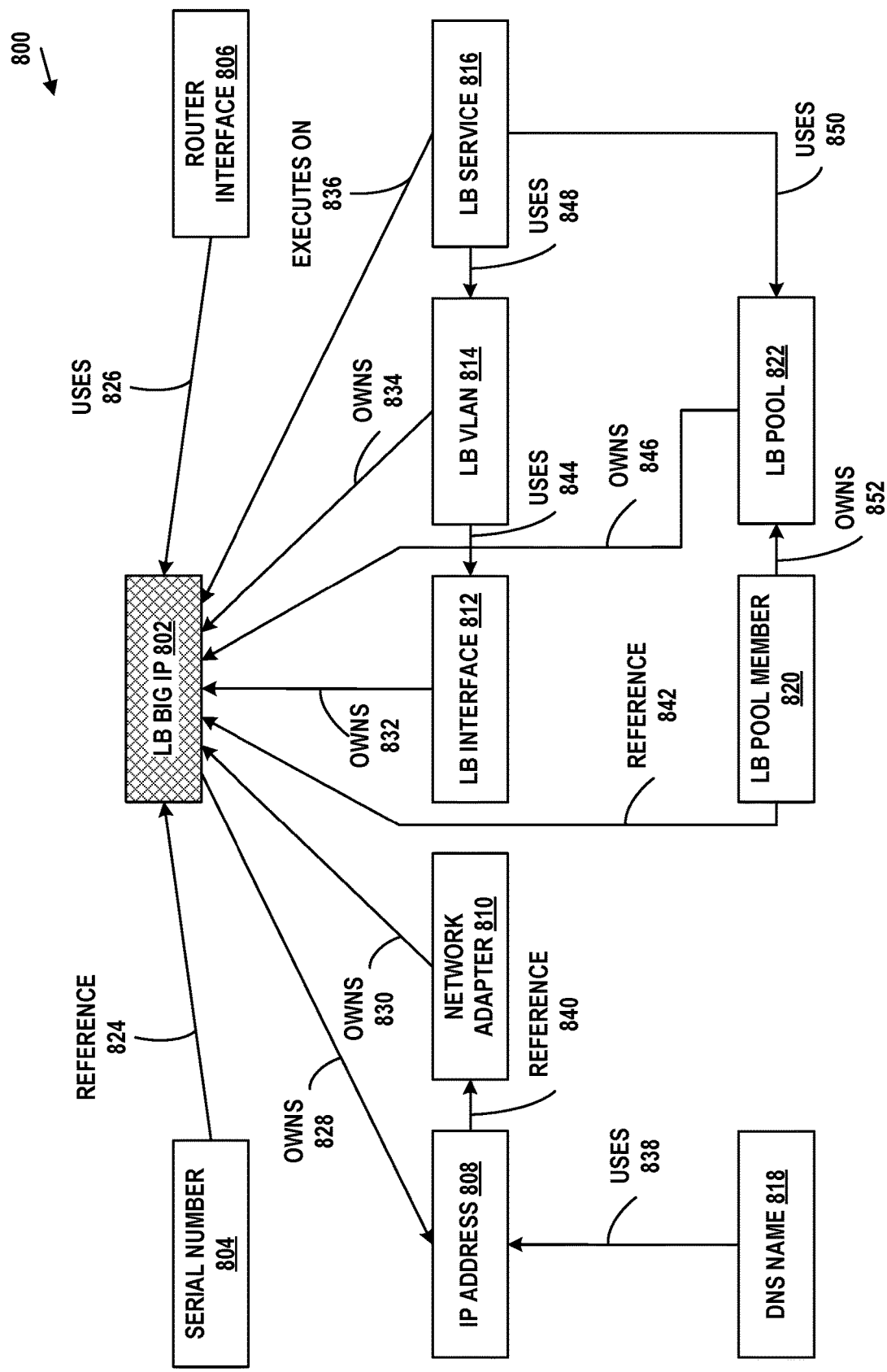
FIG. 8 illustrates a representation of a discovery pattern, in accordance with example embodiments.

Based on or in response to parsing of the source code at block 620, software application 600 may be configured to generate a representation of the discovery pattern, as indicated by block 622. The representation may include a plurality of nodes and one or more edges interconnecting the nodes. The plurality of nodes may represent the plurality of CIs while the one or more edges may represent the one or more relationships. FIG. 8 illustrates a graphical rendering of an example representation.

In some implementations, based on or in response to generation of the representation at block 622, software application 600 may optionally be configured to graphically render the representation, as indicated by block 624. Thus, software application 600 may be configured to visually represent the CI structure according to which the discovery pattern is configured to operate. Such a graphical rendering of the CI structure of the discovery pattern may allow a user to quickly and efficiently understand the function, role, and/or purpose of the discovery pattern without having to manually review any of the source code. Software application 600 may additionally or alternatively be configured to graphically render the representation at a later time (e.g., based on or in response to user input).

Based on or in response to generation of the representation at block 622 and/or the graphical rendering at block 624, software application 600 may be configured to transmit, to persistent storage 604, a request for storage of the representation, as indicated by arrow 626. Based on or in response to reception of the request at arrow 626, persistent storage 604 may be configured to store the representation, as indicated by block 628. The representation stored in persistent storage 604 may be later retrieved by software application 600 and/or other applications to generate additional graphical renderings of the representation of the discovery pattern. In some implementations, the representations may be associated with documentation of the corresponding discovery pattern (e.g., a web page that described how the discovery pattern works and how to use it). Thus, software application 600 may allow for at least a portion of such documentation to be automatically generated for a corresponding discovery pattern.

As the source code of the discovery pattern changes over time, the operations of block 612 through block 628 (including the operations of any arrows therebetween) may be repeated to generate an updated representation of the discovery pattern. For example, discovery application 602 may be configured to, based on or in response to storage of a new or updated discovery pattern in persistent storage 604, invoke execution of block 612, thereby automatically triggering the generation of a new or updated representation. Accordingly, because the discovery pattern representation may be stored in association with the documentation of the discovery pattern, the documentation of the discovery pattern may be at least partially updated over time as the discovery pattern is modified.

VI. Example Discovery Pattern Source Code

FIGS. 7A and 7B illustrate example portions of source code that defines a discovery pattern configured to discover and map aspects of an F5 NETWORKS® load balancer system. The source code shown in FIGS. 7A and 7B is written in Neebula Discovery Language (NDL), which is a programming language used to develop SERVICENOW® discovery patterns and other related software products. However, in other implementations, the source code of the discovery pattern may be written in another programming language such as JAVASCRIPT®. Line 700 (i.e., PATTERN {) in FIG. 7A indicates a start of the discovery pattern, line 736 (i.e., }) in FIG. 7B indicates the end of the discovery pattern, and text between these lines defines the discovery pattern. Portions of the pattern are omitted for conciseness and clarity of illustration, as indicated by the ellipses on lines 707, 714, 719, 728, and 732. The portions of the discovery pattern that are shown in FIGS. 7A and 7B provide examples of the textual patterns of alphanumeric keywords that software application 600 may be configured to search for in order to identify the CIs and relationships therebetween configured to be generated by the discovery pattern.

Lines 701-706 define metadata associated with the discovery pattern. Specifically, lines 701 (i.e., METADATA {) and 706 (i.e., }) signal the start and end, respectively, of the metadata section of the discovery pattern. Line 702 (i.e., ID="7C3386A20FF29200A52AFA6CE1050EA8") defines a unique ID associated with the discovery pattern that may allow software application 600, discovery application 602, and/or persistent storage 604 to disambiguate this discovery pattern from other discovery patterns. Line 703 (i.e., NAME="F5 LOAD BALANCER") defines a name of the discovery pattern that may facilitate disambiguation of the discovery pattern by a programmer or user. Line 704 (i.e., DESCRIPTION="DISCOVERY PATTERN FOR F5 LOAD BALANCER") describes a function, role, and/or purpose of the discovery pattern.

Line 705 (i.e., CITYPE="CMDB_CI_LB_BIGIP") defines a main CI that represents a computing system to which the discovery pattern is targeted (i.e., the F5 NETWORKS® load balancer system, in the example shown). The computing system may be made up of a plurality of different computing resources. Thus, the main CI may represent the computing system, while other CIs of the discovery pattern may represent the plurality of different computing resources that make up the computing system. The main CI may alternatively be referred to or viewed as a root CI. Thus, the other CIs of the discovery pattern may be viewed as depending from or belonging to the main CI. The main CI may be indicated within the representation of the discovery pattern by a distinct node, which may be referred to or viewed as a main node and/or a root node.

Lines 708-718 define a step of the discovery pattern. A "step" of a discovery pattern may be viewed as a function or operation that, collectively with other steps, defines the behavior of the discovery pattern. Specifically, lines 708 (i.e., STEP {) and 718 (i.e., }) signal the start and end, respectively, of the step. Line 709 (i.e., NAME="REF BETWEEN SERIAL TO LB") defines a name of the step, which disambiguates this step from other steps of the discovery pattern. Specifically, this step is configured to generate a relationship between two CIs.

Lines 710-717 define a relationship between the two CIs. Specifically, lines 710 (i.e., RELATION REFERENCE {) and 717 (i.e., }) signal a start and an end, respectively, of the definition of the relationships between the CIs. Line 711 (i.e., TABLE1_NAME="CMDB_SERIAL_NUMBER") indicates a first CI, stored in a table, that will be related to a second CI, also stored in a table and indicated by line 712 (i.e., TABLE2_NAME="CMDB_CI_LB_BIGIP"). Line 713 (i.e., RESULT_TABLE_NAME="SER_TO_LB") indicates a table that stores the relationship between the first CI of line 711 and the second CI of line 712. One or more conditions or operations related to creating the relationship in lines 710-717 may be included as part of the corresponding step, but are not shown herein as indicated by the ellipsis on line 714.

Notably, "CMDB_CI_LB_BIGIP" has been defined on line 705, while "CMDB_SERIAL_NUMBER" may be defined by an additional step (not shown) of the discovery pattern defined before line 708. This additional step may include operations configured to generate the "CMDB_SERIAL_NUMBER" CI and obtain one or more values therefor from the computing system undergoing discovery. Thus, the "CMDB_SERIAL_NUMBER" CI may be identified within the discovery pattern based on this additional step and/or based on the step in lines 708-718, while the relationships between the "CMDB_SERIAL_NUMBER" CI and the "CMDB_CI_LB_BIGIP" CI may be identified based on the step in lines 708-718. Since software application 600 is configured to determine the structure of the discovery pattern (rather than a map of the computing resources in a particular managed network), the specific operations involved in obtaining the values for the "CMDB_SERIAL_NUMBER" CI may be immaterial, but the fact that this CI is generated by the discovery pattern is material in determining the structure of the discovery pattern.

Lines 715 and 716 define additional attributes of the relationship between the first CI "CMDB_SERIAL_NUMBER" and the second CI "CMDB_CI_LB_BIGIP." Specifically, Line 715 (i.e., REF_DIRECTION=PARENTTOCHILD) indicates a direction of the relationship. That is, line 715 indicates that the first CI "CMDB_SERIAL_NUMBER" is a parent of the second (child) CI "CMDB_CI_LB_BIGIP." Line 716 (i.e., RELATION_TYPE="REFERENCE") indicates a type of the relationship. That is, line 716 indicates that the first CI "CMDB_SERIAL_NUMBER" references the second CI "CMDB_CI_LB_BIGIP." Other possible relationships types include an "executing on" relationship, a "using" relationship, an "owning" relationship, a "managing" relationship, an "allocated from" relationship, a "representing a cluster of" relationship, a "consuming" relationship, or an "implementing an endpoint to" relationship, among other possibilities.

Lines 720-735 of FIG. 7B define a further step of the discovery pattern. Specifically, lines 720 (i.e., STEP {) and 735 (i.e., }) signal the start and end, respectively, of the further step. Line 721 (i.e., NAME="REF/REL BETWEEN POOL AND PMEMBER") defines the name of the further step. Lines 722-734 define a relationship between two additional CIs. Specifically, lines 722 (i.e., RELATION REFERENCE {) and 734 (i.e., }) signal a start and an end, respectively, of the definition of the relationships between the two additional CIs. Line 723 (i.e., TABLE1_NAME="CMDB_CI_LB_POOL") indicates a third CI that will be related to a fourth CI, indicated by line 725 (i.e., TABLE2 NAME="CMDB_CI_LB_POOL_MEMBER").

Line 727 (i.e., RESULT_TABLE_NAME= "P_MEMBER_TO_POOL") indicates a table that stores the relationship between the third CI of line 723 and the fourth CI of line 725.

Since each of the third and fourth CIs is stored as a table, lines 724 (i.e., KEY1_NAME="NAME") and 726 (i.e., KEY2_NAME="POOLNAME") indicate the row or column of the respective table to be used in creating the relationship. Thus, for example, entries in the "NAME" column "CMDB_CI_LB_POOL" may be related to corresponding entries in the "POOLNAME" column of "CMDB_CI_LB_POOL_MEMBER."

Each of the third CI "CMDB_CI_LB_POOL" and the fourth CI "CMDB_CI_LB_POOL_MEMBER" may be defined by a respective additional step (not shown) of the discovery pattern defined before line 720. Each respective additional step may include operations configured to generate the corresponding CI and obtain one or more values therefor from the computing system undergoing discovery. Additionally, one or more conditions or operations related to creating the relationship in lines 722-734 may be included as part of the corresponding step, but are not shown herein as indicated by the ellipsis on line 728.

Lines 729 and 730 define additional attributes of the relationship between the third CI "CMDB_CI_LB_POOL" and the fourth CI "CMDB_CI_LB_POOL_MEMBER." Specifically, Line 729 (i.e., REF_DIRECTION= CHILD-TOPARENT) indicates a direction of the relationship. That is, line 729 indicates that the third CI "CMDB_CI_LB_POOL" is a child of the third (parent) CI "CMDB_CI_LB_POOL_MEMBER." Line 730 (i.e., RELATION_TYPE="OWNS::OWNED BY") indicates a type of the relationship. That is, line 730 indicates that the fourth CI "CMDB_CI_LB_POOL_MEMBER" owns the third CI "CMDB_CI_LB_POOL" and, consequently, the third CI "CMDB_CI_LB_POOL" is owned by the fourth CI "CMDB_CI_LB_POOL_MEMBER."

VII. Example Discovery Pattern Representation

FIG. 8 graphically illustrates representation 800 of the discovery pattern that may be generated on the basis of the corresponding source code, portions of which are shown in FIGS. 7A and 7B. Representation 800 includes a plurality of blocks, or nodes, interconnected by arrows, or edges. Each block represents a corresponding CI identified within a discovery pattern, while each arrow indicates a relationship between respective CIs connected by the arrow. Additionally, the direction of the arrow indicates a direction of the relationships (from a parent CI to a child CI), and each arrow is labeled with a type of relationship that it represents.

Specifically, representation 800 includes load balancer (LB) BIG IP® node 802, serial number node 804, router interface node 806, IP address node 808, network adapter node 810, LB interface node 812, LB virtual local area network (VLAN) node 814, LB service node 816, DNS name node 818, LB pool member node 820, and LB pool node 822. LB BIG IP® node 802 is shown with a hatched pattern to indicate that node 802 is the main node representing the F5 NETWORKS® load balancer system, while the other nodes represent components, aspects, or attributes of this load balancer system. Serial number node 804 may correspond to the first CI "CMDB_SERIAL_NUMBER," LB BIG IP® node 802 may correspond to the second CI "CMDB_CI_LB_BIGIP," LB pool node 822 may correspond to the fourth CI "CMDB_CI_LB_POOL," and LB pool member node 820 may correspond to the fifth CI "CMDB_CI_LB_POOL_MEMBER." Although the source code corresponding to the other nodes in representation 800 is omitted from FIGS. 7A and 7B, these nodes may be defined and related to one another by source codes statements similar to those shown in FIGS. 7A and 7B.

Edge 824 runs between serial number node 804 and LB BIG IP® node 802 and indicates that serial number node 804 (parent) references LB BIG IP® node 802 (child). Edge 826 runs between router interface node 806 and LB BIG IP® node 802 and indicates that router interface node 806 (parent) uses LB BIG IP® node 802 (child). Edge 828 runs between LB BIG IP® node 802 and IP address node 808 and indicates that LB BIG IP® node 802 (parent) owns IP address node 808 (child). Edge 838 runs between DNS name node 818 and IP address node 808 and indicates that DNS name node 818 (parent) uses IP address node 808 (child). Edge 840 runs between IP address node 808 and network adapter node 810 and indicates that IP address node 808 (parent) references network adapter node 810 (child). Edge 830 runs between network adapter node 810 and LB BIG IP® node 802 and indicates that network adapter node 810 (parent) owns LB BIG IP® node 802 (child).

Edge 832 runs between LB interface node 812 and LB BIG IP® node 802 and indicates that LB interface node 812 (parent) owns LB BIG IP® node 802 (child). Edge 834 runs between LB VLAN node 814 and LB BIG IP® node 802 and indicates that LB VLAN node 814 (parent) owns LB BIG IP® node 802 (child). Edge 836 runs between LB service node 816 and LB BIG IP® node 802 and indicates that LB service node 816 (parent) executes on LB BIG IP® node 802 (child). Edge 842 runs between LB pool member node 820 and LB BIG IP® node 802 and indicates that LB pool member node 820 (parent) references LB BIG IP® node 802 (child). Edge 846 runs between LB pool node 822 and LB BIG IP® node 802 and indicates that LB pool node 822 (parent) owns LB BIG IP® node 802 (child).

Edge 844 runs between LB VLAN node 814 and LB interface node 812 and indicates that LB VLAN node 814 (parent) uses LB interface node 812 (child). Edge 848 runs between LB service node 816 and LB VLAN node 814 and indicates that LB service node 816 (parent) uses LB VLAN node 814 (child). Edge 850 runs between LB service node 816 and LB pool node 822 and indicates that LB service node 816 (parent) uses LB pool node 822 (child). Edge 852 runs between LB pool member node 820 and LB pool node 822 and indicates that LB pool member node 820 (parent) owns LB pool node 822 (child).

Edge 824 may be generated based on lines 710-717 of the source code shown in FIG. 7A, and edge 852 may be generated based on lines 722-734 of the source code shown in FIG. 7B. The remaining edges may be generated based on other corresponding lines (not shown) of the source code of FIGS. 7A and 7B that similarly define the relationships shown in representation 800.

Representation 800 indicates the structure according to which components of the F5 NETWORKS® load balancer are expected to be arranged. Execution of the discovery pattern (e.g., by discovery application 602) on managed network 300 may generate, for each respective node of the nodes in representation 800, one or more instantiations of the respective node representing an occurrence of the corresponding computer resource within or in association with managed network 300. For example, managed network 300 may utilize a single occurrence of the BIG IP® load balancer, which may include a plurality of LB pools, each of which may include a plurality of pool members. Accordingly, the map of the LB BIG IP® load balancer generated by discovery application 602 may include a single instantiation of LB BIG IP® node 802 and a plurality of instantiations of nodes 820 and 822, each of which may be arranged and/or related to other node instantiations according to the structure illustrated by representation 800.

While FIGS. 7A, 7B, and 8 illustrate the source code and corresponding representation 800 of a discovery pattern targeted at the F5 NETWORKS® BIG IP® load balancer system, software application 600 may additionally or alternatively be configured to perform commensurate operations with respect to any other discovery pattern aimed at different computing systems. Each computing system may include a corresponding arrangement of different computing resources which may result in the discovery pattern designed therefor, and the representation of this discovery pattern, having a different structure and/or arrangement.

Additionally, while FIG. 8 illustrates representation 800 graphically, representation 800 may, alternatively or additionally, be represented textually. For example, node 804, node 802, and the relationship therebetween may be represented as "serial number node 804→LB BIG IP® node 802: reference", while node 814, node 812, and the relationship therebetween may be represented as "LB VLAN node 814→LB interface node 812: uses". Other textual formats of the representation are possible.

Notably, discovery application 602 may facilitate the writing of the discovery pattern source code. For example, discovery application 602 may assist with formatting and organizing of the source code by graphically separating each step of the discovery pattern and/or dividing the pattern into a series of blocks. The blocks may be displayed as a sequential list that indicates the order in which the steps of the discovery pattern are executed. Unlike such a list, representation 800 indicates the information that the discovery pattern is configured to extract from a computing system upon execution. Thus, representation 800 indicates a structure of the output of the discovery pattern, rather than merely showing how the source code of the discovery pattern is organized.

VIII. Example Discovery Pattern Operations Sequence

Software application 600 may additionally be configured to generate a second representation of the discovery pattern. The second representation may indicate, for each respective CI of the plurality of CIs determined within the source code of a discovery pattern, an order in which functions (i.e., steps) of the discovery pattern are executed to generate and update the respective CI. Thus, rather than indicating how the respective CI relates to other CIs configured to be generated by the discovery pattern, representation 900 may indicate how the respective CI relates to the various functions that make up the discovery pattern.

Figure 9:
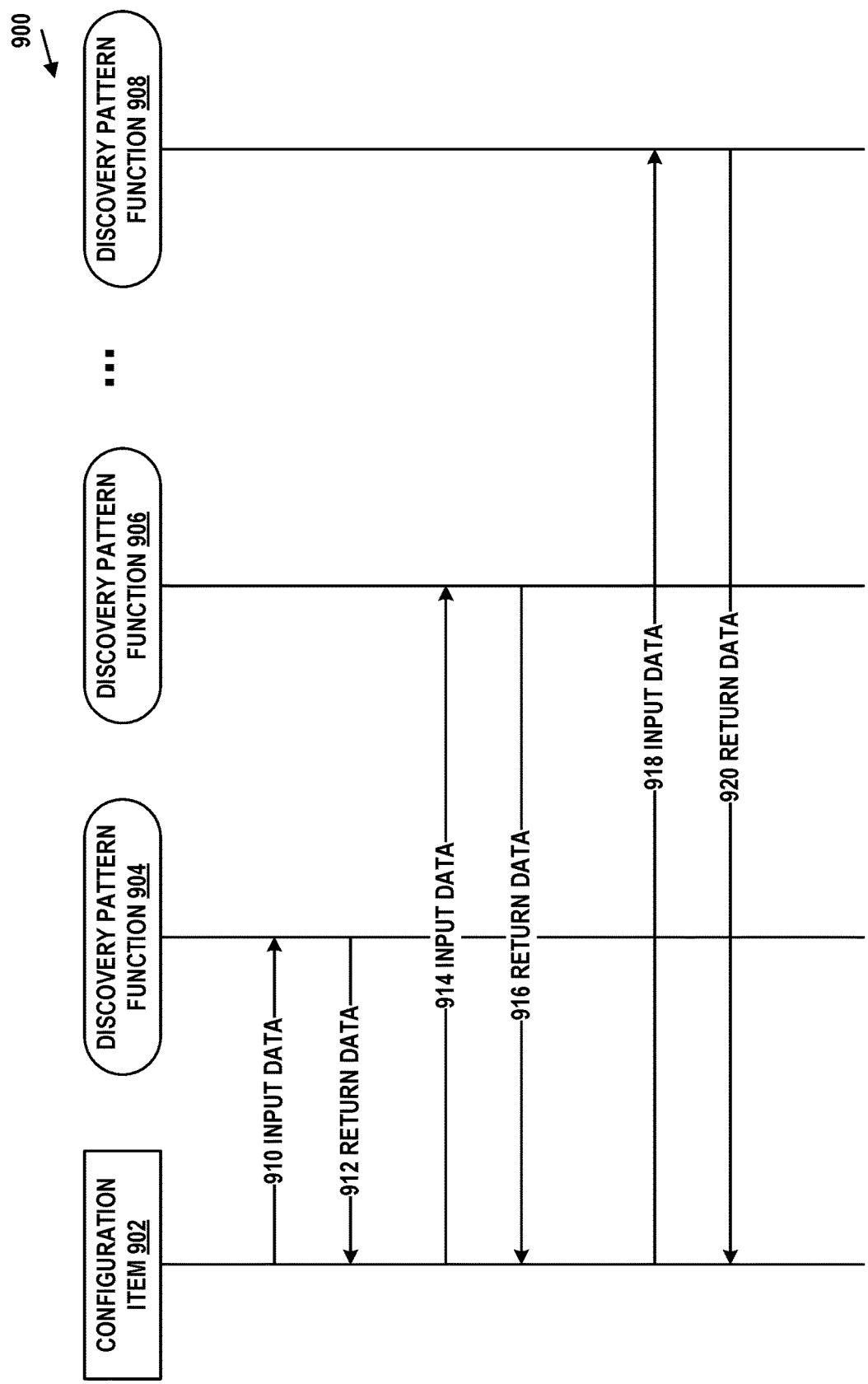
FIG. 9 is a message flow diagram, in accordance with example embodiments.

FIG. 9 illustrates an example representation 900 of the functions that modify a particular CI. Specifically, representation 900 includes CI 902, discovery pattern function 904, and discovery pattern function 906 through discovery pattern function 908 (i.e., discovery pattern functions 904-908). Each of discovery pattern functions 904-908 may represent one or more operations contained within a STEP{ . . . } text block of the source code that defines the corresponding discovery pattern. In other implementations, each of discovery pattern functions 904-908 may alternatively represent a different unit of source code.

Discovery pattern functions 904-908 are arranged from left to right in a sequence that indicates an order in which these functions are invoked and/or executed with respect to CI 902. For example, discovery pattern function 904 may be configured to generate CI 902 on the basis of input data 910, and generate return data 912. Return data 912 may include one or more values or attributes for CI 902. Discovery pattern function 906 may be configured to subsequently modify CI 902 on the basis of input data 914, and generate return data 916. In some cases, input data 914 may include aspects of return data 912. Return data 916 may include one or more additional values or attributes for CI 902. For example, in the context of the F5 NETWORKS® BIG IP® load balancer system discovery, discovery pattern function 904 may be configured to generate the LB pool CI, while discovery pattern function 906 may be configured to identify, for each respective LB pool CI, the LB pool member CIs that belong to the respective LB pool CI.

Discovery pattern function 908 may subsequently be configured to subsequently modify CI 902 on the basis of input data 918, and generate return data 920. In some cases, input data 918 may include aspects of return data 916. Return data 920 may include one or more additional values or attributes for CI 902. For example, in the context of the F5 NETWORKS® BIG IP® load balancer system discovery, discovery pattern function 908 may be configured to relate each of the LB pool member CIs, generated by discovery pattern function 906, to the LB BIG IP® CI.

Each respective CI configured to be generated by the discovery pattern may be associated with a corresponding representation that illustrates the temporal progression of the respective CI through the various functions of the discovery pattern. Thus, the corresponding representation may indicate how the respective CI is generated and modified by the discovery pattern to generate the final version of the respective CI that is included in the map generated by the discovery pattern. Representations such as representation 900 of FIG. 9 may assist with understanding how the discovery pattern operates, and thus with modifying and/or debugging the discovery pattern.

IX. Example Operations

Figure 10:
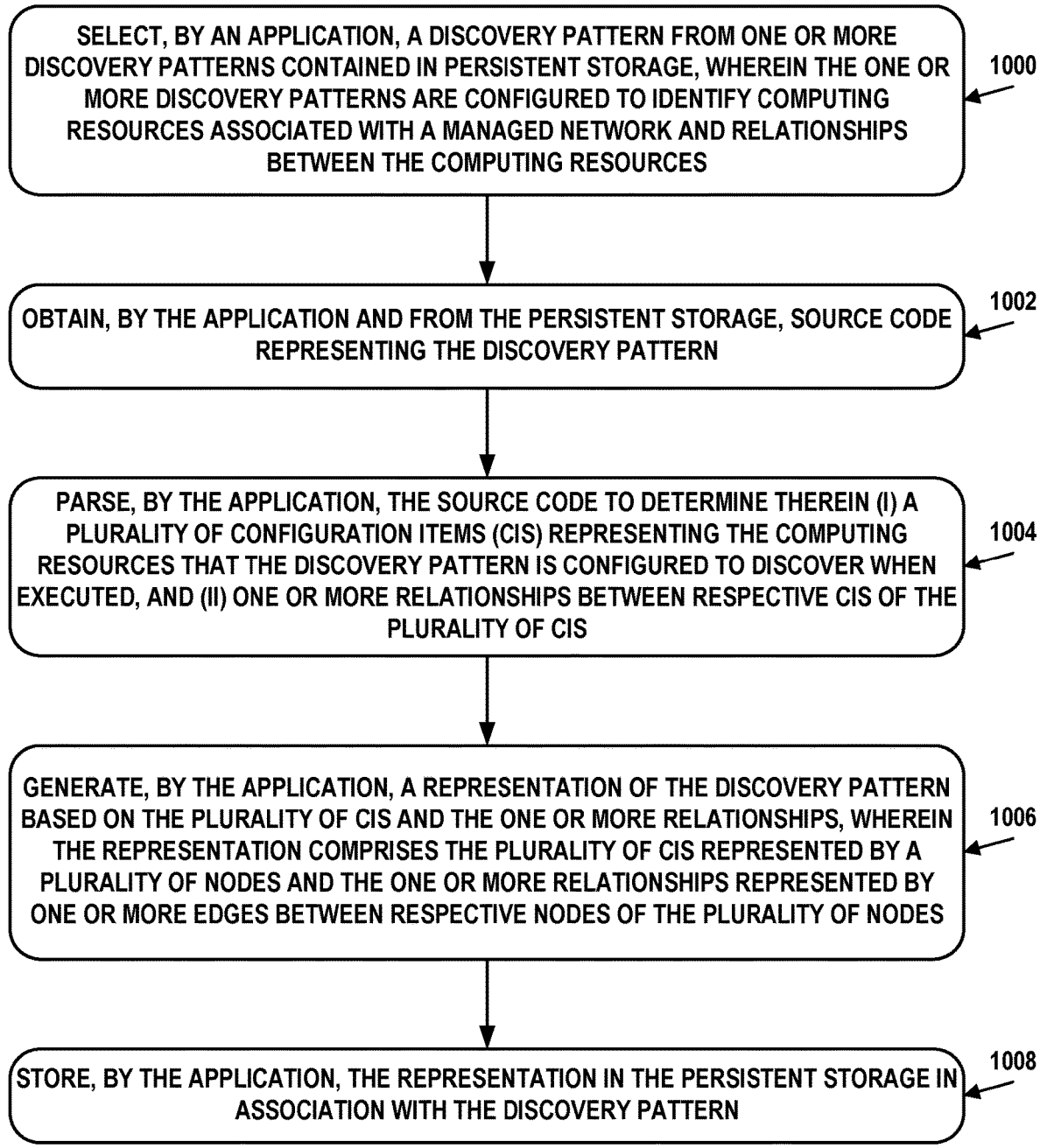
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve selecting, by an application, a discovery pattern from one or more discovery patterns contained in persistent storage. The one or more discovery patterns may be configured to identify computing resources associated with a managed network and relationships between the computing resources.

Block 1002 may involve obtaining, by the application and from the persistent storage, source code representing the discovery pattern.

Block 1004 may involve parsing, by the application, the source code to determine therein (i) a plurality of configuration items (CIs) representing the computing resources that the discovery pattern is configured to discover when executed, and (ii) one or more relationships between respective CIs of the plurality of CIs.

Block 1006 may involve generating, by the application, a representation of the discovery pattern based on the plurality of CIs and the one or more relationships. The representation may include the plurality of CIs represented by a plurality of nodes and the one or more relationships represented by one or more edges between respective nodes of the plurality of nodes.

Block 1008 may involve storing, by the application, the representation in the persistent storage in association with the discovery pattern.

In some embodiments, the application may be configured to determine that the discovery pattern has been modified. The application may also be configured to obtain, from the persistent storage, source code representing the discovery pattern as modified. The application may additionally be configured to parse the source code to determine therein (i) an updated plurality of CIs, and (ii) an updated one or more relationships between respective CIs of the updated plurality of CIs. The application may further be configured to generate an updated representation of the discovery pattern based on the updated plurality of CIs and the updated one or more relationships. The application may yet further be configured to store the updated representation in the persistent storage in association with the discovery pattern.

In some embodiments, the application may be configured to parse the source code to determine, for each respective CI of the plurality of CIs, an order in which functions of the discovery pattern associated with the respective CI are executed to generate the respective CI. The application may also be configured to generate a second representation of the discovery pattern based on the order. The second representation may include the functions of the discovery pattern associated with the respective CI represented by a second plurality of nodes. Respective nodes of the second plurality of nodes may form a sequence according to the order. The application may additionally be configured to store the second representation in the persistent storage in association with the discovery pattern.

In some embodiments, the application may be configured to receive, by way of a user interface, a request to display a visualization of the representation and, in response to receiving the request, retrieve the representation from the persistent storage. The application may also be configured to generating image data that graphically visualizes the representation, and provide instructions for display of the image data.

In some embodiments, the discovery pattern, when executed on the managed network, may be configured to generate a map of the plurality of computing resources. The map may include: (i) for each respective CI of the plurality of CIs, one or more instantiations of the respective CI representing one or more occurrences of a corresponding computing resource within the managed network, and (ii) for each respective relationship of the one or more relationships between respective CIs of the plurality of CIs, one or more indications of the respective relationship between instantiations of the respective CIs.

In some embodiments, the plurality of CIs may include a main CI that represents a computing system to which the discovery pattern is targeted. Other CIs of the plurality of CIs may represent components of the computing system. A first node of the plurality of nodes that represents the main CI may be distinct from other nodes of the plurality of nodes.

In some embodiments, each respective edge of the one or more edges may be associated with an indication of a direction and a type of the relationship represented by the respective edge. The application may be configured to parse the source code to additionally identify, for each respective relationship of the one or more relationships between the respective CIs (i) a direction from a child CI to a parent CI of the respective relationship or from the parent CI to the child CI of the respective relationship, and (ii) a type of the respective relationship.

In some embodiments, the type of the respective relationship may be at least one of: (i) a first CI in the relationship executing on a second CI in the relationship, (ii) the first CI referencing the second CI, (iii) the first CI using the second CI, (iv) a first CI owning the second CI, (v) the first CI managing the second CI, (vi) the first CI being allocated from the second CI, (vii) the first CI representing a cluster of the second CI, (viii) the first CI consuming the second CI, or (ix) the first CI implementing an endpoint to the second CI.

In some embodiments, storing the representation in the persistent storage in association with the discovery pattern may include storing the representation in association with a documentation page corresponding to the discovery pattern.

In some embodiments, obtaining source code representing the discovery pattern may include obtaining (i) first source code that implements the discovery pattern and (ii) second source code of a software library invoked by the first source code.

In some embodiments, parsing the source code to determine therein the plurality of CIs and the one or more relationships between respective CIs of the plurality of CIs may include searching the source code for a textual pattern of one or more alphanumeric keywords that identify the CIs or the one or more relationships.

In some embodiments, the application may form part of a discovery application configured to provide for at least one of defining the one or more discovery patterns or executing the one or more discovery patterns.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
    persistent storage containing one or more discovery patterns configured to identify computing resources associated with a managed network and relationships between the computing resources; and
    an application configured to perform operations comprising:
        selecting a discovery pattern from the one or more discovery patterns;
        obtaining, from the persistent storage, source code representing the discovery pattern;
        parsing the source code to determine therein (i) a plurality of configuration items (CIs) representing the computing resources that the discovery pattern is configured to discover when executed, and (ii) one or more relationships between respective CIs of the plurality of CIs;
        generating a representation of the discovery pattern based on the plurality of CIs and the one or more relationships, wherein the representation comprises the plurality of CIs represented by a plurality of nodes and the one or more relationships represented by one or more edges between respective nodes of the plurality of nodes; and
        storing the representation in the persistent storage in association with the discovery pattern.

2. The computing system of claim 1, wherein the operations further comprise:
    determining that the discovery pattern has been modified;
    obtaining, from the persistent storage, source code representing the discovery pattern as modified;
    parsing the source code to determine therein (i) an updated plurality of CIs, and (ii) an updated one or more relationships between respective CIs of the updated plurality of CIs;
    generating an updated representation of the discovery pattern based on the updated plurality of CIs and the updated one or more relationships; and
    storing the updated representation in the persistent storage in association with the discovery pattern.

3. The computing system of claim 1, wherein the operations further comprise:
    parsing the source code to determine, for each respective CI of the plurality of CIs, an order in which functions of the discovery pattern associated with the respective CI are executed to generate the respective CI;
    generating a second representation of the discovery pattern based on the order, wherein the second representation comprises the functions of the discovery pattern associated with the respective CI represented by a second plurality of nodes, and wherein respective nodes of the second plurality of nodes form a sequence according to the order; and
    storing the second representation in the persistent storage in association with the discovery pattern.

4. The computing system of claim 1, wherein the operations further comprise:
    receiving, by way of a user interface, a request to display a visualization of the representation;
    in response to receiving the request, retrieving the representation from the persistent storage;
    generating image data that graphically visualizes the representation; and
    providing instructions for display of the image data.

5. The computing system of claim 1, wherein the discovery pattern, when executed on the managed network, is configured to generate a map of the plurality of computing resources, wherein the map comprises: (i) for each respective CI of the plurality of CIs, one or more instantiations of the respective CI representing one or more occurrences of a corresponding computing resource within the managed network, and (ii) for each respective relationship of the one or more relationships between respective CIs of the plurality of CIs, one or more indications of the respective relationship between instantiations of the respective CIs.

6. The computing system of claim 1, wherein the plurality of CIs comprises a main CI that represents a computing system to which the discovery pattern is targeted, wherein other CIs of the plurality of CIs represent components of the computing system, and wherein a first node of the plurality of nodes that represents the main CI is distinct from other nodes of the plurality of nodes.

7. The computing system of claim 1, wherein each respective edge of the one or more edges is associated with an indication of a direction and a type of the relationship represented by the respective edge, and wherein the operations further comprise:

parsing the source code to additionally identify, for each respective relationship of the one or more relationships between the respective CIs (i) a direction from a child CI to a parent CI of the respective relationship or from the parent CI to the child CI of the respective relationship, and (ii) a type of the respective relationship.

8. The computing system of claim 7, wherein the type of the respective relationship is at least one of: (i) a first CI in the relationship executing on a second CI in the relationship, (ii) the first CI referencing the second CI, (iii) the first CI using the second CI, (iv) a first CI owning the second CI, (v) the first CI managing the second CI, (vi) the first CI being allocated from the second CI, (vii) the first CI representing a cluster of the second CI, (viii) the first CI consuming the second CI, or (ix) the first CI implementing an endpoint to the second CI.

9. The computing system of claim 1, wherein storing the representation in the persistent storage in association with the discovery pattern comprises:

storing the representation in association with a documentation page corresponding to the discovery pattern.

10. The computing system of claim 1, wherein obtaining source code representing the discovery pattern comprises:

obtaining (i) first source code that implements the discovery pattern and (ii) second source code of a software library invoked by the first source code.

11. The computing system of claim 1, wherein parsing the source code to determine therein the plurality of CIs and the one or more relationships between respective CIs of the plurality of CIs comprises:

searching the source code for a textual pattern of one or more alphanumeric keywords that identify the CIs or the one or more relationships.

12. The computing system of claim 1, wherein the application forms part of a discovery application configured to provide for at least one of defining the one or more discovery patterns or executing the one or more discovery patterns.

13. A computer-implemented method comprising:

selecting, by an application, a discovery pattern from one or more discovery patterns contained in persistent storage, wherein the one or more discovery patterns are configured to identify computing resources associated with a managed network and relationships between the computing resources;

obtaining, by the application and from the persistent storage, source code representing the discovery pattern;

parsing, by the application, the source code to determine therein (i) a plurality of configuration items (CIs) representing the computing resources that the discovery pattern is configured to discover when executed, and (ii) one or more relationships between respective CIs of the plurality of CIs;

generating, by the application, a representation of the discovery pattern based on the plurality of CIs and the one or more relationships, wherein the representation comprises the plurality of CIs represented by a plurality of nodes and the one or more relationships represented by one or more edges between respective nodes of the plurality of nodes; and storing, by the application, the representation in the persistent storage in association with the discovery pattern.

14. The computer-implemented method of claim 13, further comprising:

determining that the discovery pattern has been modified;

obtaining, from the persistent storage, source code representing the discovery pattern as modified;

parsing the source code to determine therein (i) an updated plurality of CIs, and (ii) an updated one or more relationships between respective CIs of the updated plurality of CIs;

generating an updated representation of the discovery pattern based on the updated plurality of CIs and the updated one or more relationships; and storing the updated representation in the persistent storage in association with the discovery pattern.

15. The computer-implemented method of claim 13, further comprising:

parsing the source code to determine, for each respective CI of the plurality of CIs, an order in which functions of the discovery pattern associated with the respective CI are executed to generate the respective CI;

generating a second representation of the discovery pattern based on the order, wherein the second representation comprises the functions of the discovery pattern associated with the respective CI represented by a second plurality of nodes, and wherein respective nodes of the second plurality of nodes form a sequence according to the order; and storing the second representation in the persistent storage in association with the discovery pattern.

16. The computer-implemented method of claim 13, further comprising:

receiving, by way of a user interface, a request to display a visualization of the representation;

in response to receiving the request, retrieving the representation from the persistent storage;

generating image data that graphically visualizes the representation; and providing instructions for display of the image data.

17. The computer-implemented method of claim 13, wherein the discovery pattern, when executed on the managed network, is configured to generate a map of the plurality of computing resources, wherein the map comprises: (i) for each respective CI of the plurality of CIs, one or more instantiations of the respective CI representing one or more occurrences of a corresponding computing resource within the managed network, and (ii) for each respective relationship of the one or more relationships between respective CIs of the plurality of CIs, one or more indications of the respective relationship between instantiations of the respective CIs.

18. The computer-implemented method of claim 13, wherein the plurality of CIs comprises a main CI that represents a computing system to which the discovery pattern is targeted, wherein other CIs of the plurality of CIs represent components of the computing system, and wherein a first node of the plurality of nodes that represents the main CI is distinct from other nodes of the plurality of nodes.

19. The computer-implemented method of claim 13, wherein each respective edge of the one or more edges is associated with an indication of a direction and a type of the relationship represented by the respective edge, and wherein the computer-implemented method further comprises:

parsing the source code to additionally identify, for each respective relationship of the one or more relationships between the respective CIs (i) a direction from a child CI to a parent CI of the respective relationship or from the parent CI to the child CI of the respective relationship, and (ii) a type of the respective relationship.

20. An article of manufacture including a non-transitory computer-readable medium, having stored thereon program instructions that, upon execution by a computing system, cause the computing system to perform operations comprising:

selecting a discovery pattern from one or more discovery patterns contained in persistent storage, wherein the one or more discovery patterns are configured to identify computing resources associated with a managed network and relationships between the computing resources;

obtaining, from the persistent storage, source code representing the discovery pattern;

parsing the source code to determine therein (i) a plurality of configuration items (CIs) representing the computing resources that the discovery pattern is configured to discover when executed, and (ii) one or more relationships between respective CIs of the plurality of CIs;

generating a representation of the discovery pattern based on the plurality of CIs and the one or more relationships, wherein the representation comprises the plurality of CIs represented by a plurality of nodes and the one or more relationships represented by one or more edges between respective nodes of the plurality of nodes; and storing the representation in the persistent storage in association with the discovery pattern.

\* \* \* \* \*